UNITED STATES PATENT OFFICE.

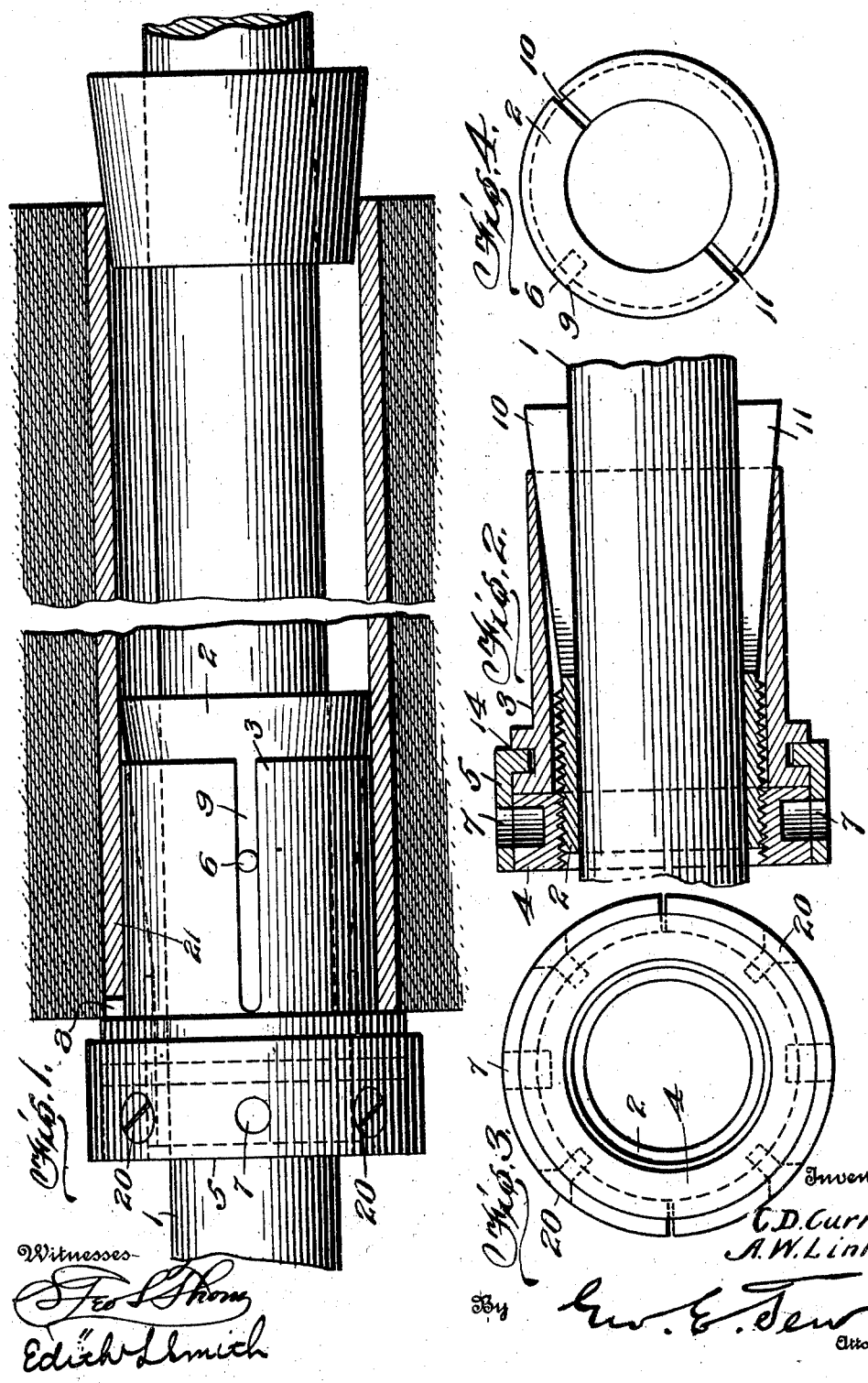

CLAUD D. CURRY AND ALBERT W. LINN, OF MEMPHIS, TENNESSEE, ASSIGNORS OF ONE-SIXTH TO AMOS T. MOORE AND ONE-SIXTH TO WILLIAM M. CLEMENS, BOTH OF MEMPHIS, TENNESSEE.

MEANS FOR FASTENING ROLLS TO SHAFTS.

967,334. Specification of Letters Patent. Patented Aug. 16, 1910.

Application filed October 8, 1909. Serial No. 521,784.

*To all whom it may concern:*

Be it known that we, CLAUD DE VALL CURRY and ALBERT WILLIAM LINN, citizens of the United States, residing at Memphis, in the county of Shelby and State of Tennessee, have invented certain new and useful Improvements in Means for Fastening Rolls to Shafts, of which the following is a specification.

This invention is a device for fastening a roll or similar article onto a shaft, and is particularly adapted and intended for use as a chuck for locking a roll of paper onto the shaft of a printing press preparatory to feeding the web into the press for printing. The webs are usually wound on a hollow cylindrical core, and the chuck operates in connection with said core to fasten the same on the shaft and to thus hold the roll of paper in proper position while it is being unwound.

The invention is illustrated in the accompanying drawings in which—

Figure 1 is a side view of the chuck as applied to a shaft. Fig. 2 is a longitudinal section thereof. Figs. 3 and 4 are opposite end views.

Referring specifically to the drawings, 1 is the shaft to which the chuck is applied and on which the roll of paper is to be locked. Arranged to fit upon this shaft is a sleeve 2 one end of which is exteriorly threaded and the other end of which tapers toward the threads, the large end being split as indicated at 10 and 11, for a part of its length, to allow the tapered part of the sleeve to contract and expand. Mounted upon said sleeve is an outer sleeve 3, the inside of which is tapered, and this sleeve is split at one end, as indicated at 9. The inner sleeve 2 has laterally projecting pins 6 which work in the slots 9. The outer end of the sleeve 3 is provided with a circumferential groove in which fits a flange 14 on a collar 5, which collar is attached by screws 20 to a ring nut 4 which runs on the threads of the sleeve 2. The nut 4 has holes 7 to receive a pin wrench, and the end of the sleeve 3 backs against the nut when the nut is advanced. 8 is a pin on the outside of the sleeve 3 which fits in a notch in the iron core 21 to prevent the core from turning while locking up, the web being wound on the core as stated.

When the device is used, the sleeve 2 acts to clamp the shaft, and the sleeve 3 expands and engages the inside of the core on which the paper is wound. When the nut 4 is advanced the sleeve 3 expands and the sleeve 2 contracts, in consequence of the taper of the sleeves, thereby producing the result indicated. When the nut is retracted the opposite action takes place, the flange 14 acting to withdraw the sleeve 3 when the nut is retracted. The chuck will of course be entered into the iron core when the roll is placed on the shaft. The arrangement is such that the chuck when loosened can be moved along the shaft to any desired position, to accommodate paper rolls of different widths, and no key way or other special construction of the shaft is necessary.

The invention is not limited to the exact arrangement shown, but may be modified in various ways within the scope thereof.

It is to be noted that the sleeve, which clamps the shaft moves or tends to move in a direction away from the roll, and toward the end of the shaft, carrying the shaft with it, which draws the chuck at the opposite end of the shaft toward the roll, thus centering the roll as well as fastening the same to the shaft.

What we claim as new is:—

1. The combination with a shaft of inner and outer split and tapered sleeves, the inner sleeve being threaded and fitting on the shaft, and a nut on the said threads, bearing against the outer sleeve.

2. The combination of an inner sleeve threaded at one end and tapered externally and split at the other, an outer sleeve split at one end and tapered internally and fitting on the inner sleeve, and means to advance and retract the sleeves with respect to each other, to expand and contract the same.

3. The combination of inner and outer tapered sleeves, each of which is split at one end, means to advance and retract the sleeves with respect to each other, to expand and contract the same, and means to prevent relative rotation of the sleeves.

4. The combination of inner and outer split and tapered sleeves, means to advance and retract the sleeves with respect to each other, to expand and contract the same, and means to prevent relative rotation of the sleeves comprising a pin projecting from one sleeve into the slit in the other.

5. The combination of an inner sleeve threaded at one end and tapered externally and split at the other, an outer sleeve fitting over the inner sleeve and having a groove around one end and tapered and split at the other end, and a ring nut on the threaded part of the inner sleeve, having a flange connected thereto and projecting into said groove.

6. The combination with a shaft and a roll thereon, of inner and outer split and tapered sleeves the former of which fits on the shaft, the end of the inner sleeve having the greater diameter being located toward the roll, and means to advance and retract the sleeves with respect to each other, to expand and contract the same.

In testimony whereof, we affix our signatures in presence of two witnesses.

CLAUD D. CURRY.
ALBERT W. LINN.

Witnesses:
F. W. ORLEMANN,
L. J. MATHEWS.